United States Patent [19]

Tschunt et al.

[11] 4,109,155

[45] Aug. 22, 1978

[54] GAMMA CAMERA

[75] Inventors: Edgar Tschunt, Erlangen; Winfried Platz, Ratsberg; Ulrich Bär, Nuremberg; Lothar Heinz, Erlangen, all of Fed. Rep. of Germany

[73] Assignee: Siemens Aktiengesellschaft, Berlin & Munich, Fed. Rep. of Germany

[21] Appl. No.: 479,425

[22] Filed: Jun. 14, 1974

Related U.S. Application Data

[63] Continuation of Ser. No. 324,063, Jan. 16, 1973, abandoned.

[51] Int. Cl.² .............................................. G21K 1/02
[52] U.S. Cl. .................................................... 250/505
[58] Field of Search ............... 250/105, 505, 511, 513, 250/510, 522, 523

[56] References Cited

U.S. PATENT DOCUMENTS

| 2,959,680 | 11/1970 | Green .................................. 250/105 |
| 2,998,526 | 8/1961 | Green et al. ........................ 250/105 |
| 3,011,057 | 10/1961 | Anger .................................. 250/105 |
| 3,489,897 | 1/1970 | Wainer ................................ 250/505 |
| 3,631,249 | 12/1971 | Friede et al. ....................... 250/105 |
| 3,982,133 | 9/1976 | Jupa et al. .......................... 250/360 |

Primary Examiner—Bruce C. Anderson
Attorney, Agent, or Firm—Hill, Gross, Simpson, Van Santen, Steadman, Chiara & Simpson

[57] ABSTRACT

A gamma camera has a plurality of exchangeable collimators, one of which is replaceably mounted in the ray inlet opening of the camera, while the others are placed on separate supports. The invention is particularly characterized in that the supports are swingably mounted upon a column one above the other.

4 Claims, 7 Drawing Figures

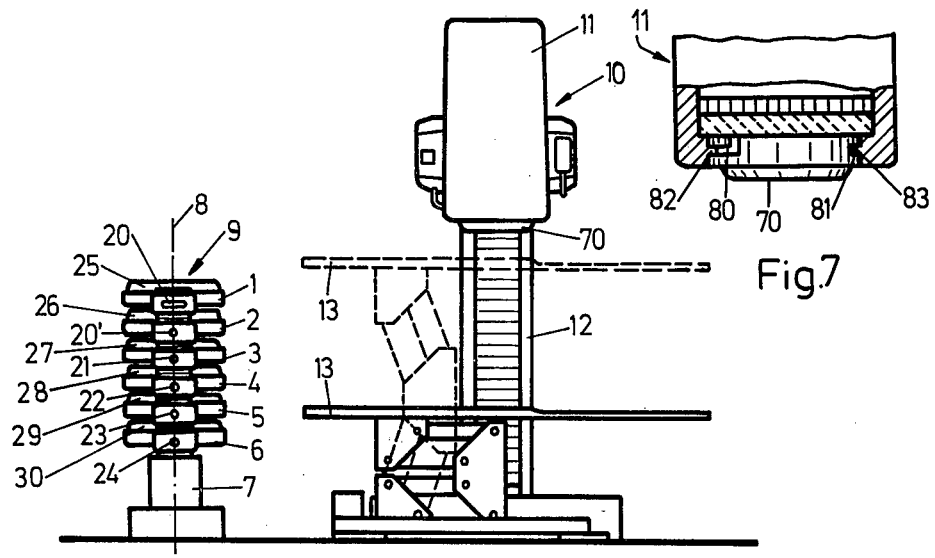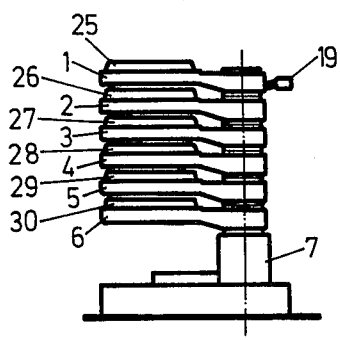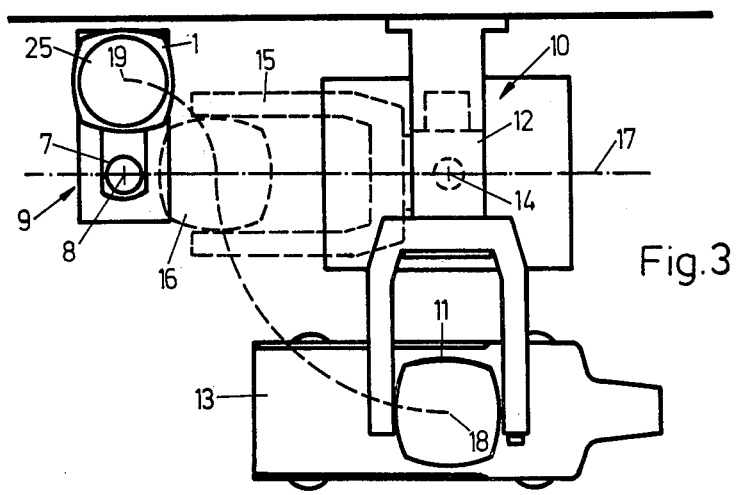

GAMMA CAMERA

This application is a continuation of U.S. Pat. application Ser. No. 324,063, filed Jan. 16, 1973, now abandoned.

This invention relates to a gamma camera having a plurality of exchangeable collimators one of which is placed in the ray inlet of the camera while others are placed in separate supports.

As is known, collimators are used in gamma cameras to keep small the underground which otherwise appears and to provide clear images. Collimators now in use have a plurality of ray transmitting channels located next to each other which depending upon the rays they receive, namely, the isotope used, have different lengths and different inner widths or wall thicknesses. It is therefore necessary to be able to exchange the collimators.

In known cameras of this type each of the provided collimators is mounted upon a separate movable support. Thus it can be moved into the camera. During exchange the original collimator is placed upon the corresponding support and moved away. A new collimator is moved in upon another support and is fixed in the ray inlet opening of the camera. Due to the heavy weight of the collimators which can amount to 100 kg and more, this transportation of collimators requires a great deal of work. Furthermore it is difficult to set the collimator and the camera correctly relatively to each other.

An object of the present invention is the provision of a gamma camera of the described type wherein the exchange of collimators is simplified.

Other objects of the present invention will become apparent in the course of the following specification.

In the accomplishment of the objectives of the present invention it was found desirable to place the supports one above the other and swingably upon a column.

While in existing devices each support must be set separately, according to the present invention it is sufficient to fix the support once, while for the exchange of the collimators it is merely necessary to swing the supports on their column. Since the supports are fixed to their column during the exchange of the collimators the relationship to the camera remains. In addition to the usual releasing and fixing operations at the camera head, it is merely necessary to carry out raisings and lowerings of the camera as well as swingings of the supports.

The reproduction of the arrangement of the supports to the camera can be greatly improved and simplified if a special fixing point is provided. This can be provided, for example, if parts of a plug connection (plug and socket) are provided in parts of the supports and the camera. The arrangement can consist of a wedge-shaped recess, for example at the foot of the camera structure and a corresponding wedge piece at the foot of the collimator holder. However, the safest solution is produced if the holder and the camera are firmly connected with each other, in that they are brought in a space at fixed points or jointly upon a basic plate. The distance should be so selected that the swinging ranges of the supports and those of the camera touch each other at one location relatively to the centers of the collimators. In a construction of this nature the swinging movements of the supports and of the camera can be mechanically adjusted one to the other. For the movement of the supports can be provided, for example, a projection which lies precisely at the location wherein during the swinging movement of the camera a recess is also provided. This provides in a simple manner an adjustment of the collimators with the ray inlet opening of the camera. For other movements of the camera as well, for example swingings about a horizontal axis, a vertical axis, etc. it is advisable to provide recesses facilitating the exchange of a collimator.

The supports can have, for example, the shape of rings, forks, plates etc., which are swingably fixed by an arm to the column. This connection takes place in a simple manner by swing bearings provided upon a part which can be placed upon a similar part or on a ground post. This provides a structure which can be enlarged and wherein the post consists of individual sections. A predetermined amount of collimators and supports can be provided depending upon need or desired consumption.

The exchange of collimators can take place by swinging the camera over a swingable plate, placing the collimator upon that plate and then swinging it away. Then a further plate is swung to the location wherein the camera head is located. After the camera is moved down the new collimator can be fixed thereon. This can take place, for example, by a rotary movement wherein projections of the collimator engage recesses of the camera as a bayonet catch, or vice versa.

The invention will appear more clearly from the following detailed description when taken in connection with the accompanying drawings showing by way of example only, preferred embodiments of the inventive idea.

In the drawings:

FIG. 1 is a front view of a camera with a collimators holder of the present invention firmly connected therewith.

FIG. 2 is a side view of the holder.

FIG. 3 is a top view of the arrangement shown in FIG. 1.

FIG. 7 is a detail section showing a camera head with a collimator.

Figure 4:
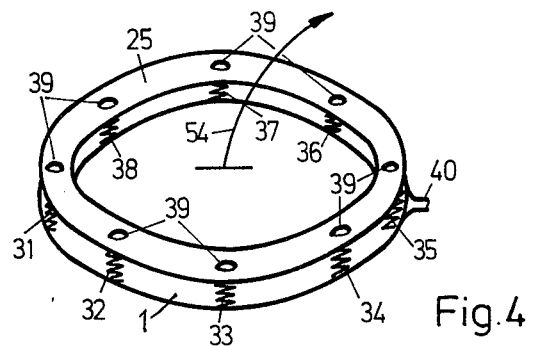
FIG. 4 is an enlarged perspective view of a support.

The drawings show supports for the collimators as plates 1 to 6. The plates are mounted upon a column 7 and are rotatable about a vertical axis 8. This entire construction 9 is combined with a gamma camera 10. The camera head 11 is adjustable in height upon a supporting column 12 so that it can be set depending upon the rising and lowering of the table 13. Furthermore, the camera head 11 is swingable about the axis 14 of the column 12, so that it can be moved into the position 15 shown by broken lines in FIG. 3. The plates can be moved one after the other into a position 16 aligned with the position 15 and also shown by broken lines in FIG. 3. For that purpose the plates are swung about the axis 8. This is attained in that the axes 8 and 14 lie upon the line 17 and are located at a distance from each other which corresponds precisely to the sum of the two rotary radii from the axis 14 to the center point 18 of the ray inlet opening of the camera and from the axis 8 to the center point 19 of the plates. Thus in the positions 15 and 16 there is a precise correspondence of the locations of the supports 1 to 6 and of the camera 11.

The camera 11 and the collimators are very heavy objects, their weights being in the range of 100 kg. These weights are of a size which reaches the prescribed floor load in clinics or even exceeds it. Therefore, the constructions 9 and 10 are firmly mounted and cannot be moved relatively to each other so that their weight distribution is fixed. This is different, however, as far as movements of the camera head 11 or of the plates 1 to 6 are concerned. In order to avoid an improper load upon the floor in case of such movements the plates are provided with a key-like grip 20. It releases the swinging of one of the plates 1 to 6. In basic position the swinging is locked. This lock can be released only by the hand grip 20 which can be introduced into one of the openings 20' to 24. However, the grip is then itself locked and can be removed only when the corresponding plate is brought back into the basic position. Thus excessive load upon the floor is eliminated.

Inserts 25 to 30 are spring held at the sides in the plates 1 to 6, so that when the collimator 70 of the camera head is introduced, small differences in positions 15 and 16 are balanced. The difference in height of the plates carried by the column 7 is balanced by the raising and lowering of the camera head 11 along the column 12. Thus, for example, a collimator can be inserted upon the plate 6 and as exchange, a collimator can be moved from the plate 1 into the camera head, whereby at first the placing takes place on the plate 6 which is swung outwardly and then is swung back. Then the camera head is raised and finally by shifting the grip 20 from the opening 24 into the corresponding opening of the support of the plate 1, the swinging movement of the plate 1 is freed and then fixing of the collimator carried by the plate in the camera head 11 can take place.

To avoid collisions between the camera head and the individual plates, the mechanism moving the camera head has switch off means which are released when the head strikes one of the plates 1 to 6.

Figure 5:
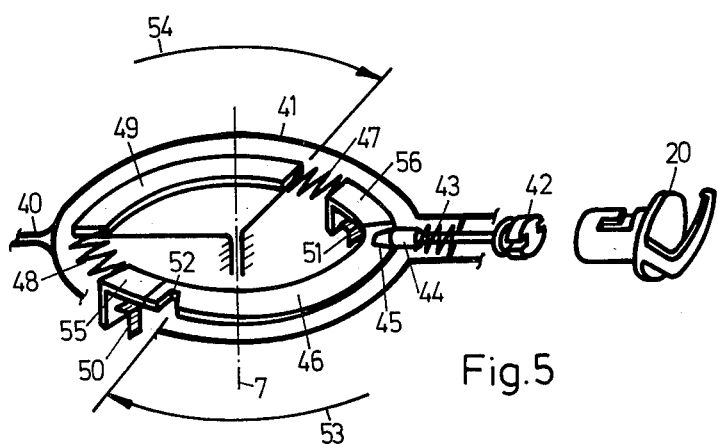
FIG. 5 is a perspective view showing details of the swinging mounting.

FIGS. 4 and 5 show the construction of a holder which with its support constitutes a structural part of the column 7. To provide side adjustment the insert 25 is fixed in the plate 1 by springs 31 to 38. Upon the upper side of the insert 25 are burls 39 which coincide with the corresponding recesses in the collimators. The burls 39 are cup-shaped so that they permit a small shifting of the insert 25 and thus an adjustment to the location of the collimator to balance tolerances when a collimator is mounted. The swinging arm 40 (FIG. 5) connects the plate 1 with the support 41 at the column 7. This support has a connection 42 for the grip 20 which is connected by a spring 43 with a pin 44. The pin engages into a recess 45 of a segment 46 which is connected by springs 47 and 48 with the column 7, shown by a broken line in FIG. 5. The column 7 carries a fixed segment 49 as well as adjustable stops 50 and 51. Furthermore, the segment 46 has a recess 52 into which the pin 44 extends when the plate is swung in the direction of the arrow 53. The removal of the grip 20 at the connection piece 42 is possible only when the plate is moved back into its basic position shown in FIG. 2 (see FIG. 6).

When the plate 1 is swung in the direction of the arrow 34 the pin 44 is moved along the segment 46 and when it reaches the position 16 it snaps into the recess 52. Then the spring 48 is compressed by the partial segment 55. Space is formed between the partial segment 56 at the other end of the segment 46 and the segment 46. When springs are returned the partial segment 56 compresses the spring 47. Due to this arrangement the desired standstill in the location 16 takes place very quickly in which the exchange of collimators takes place.

Figure 6:
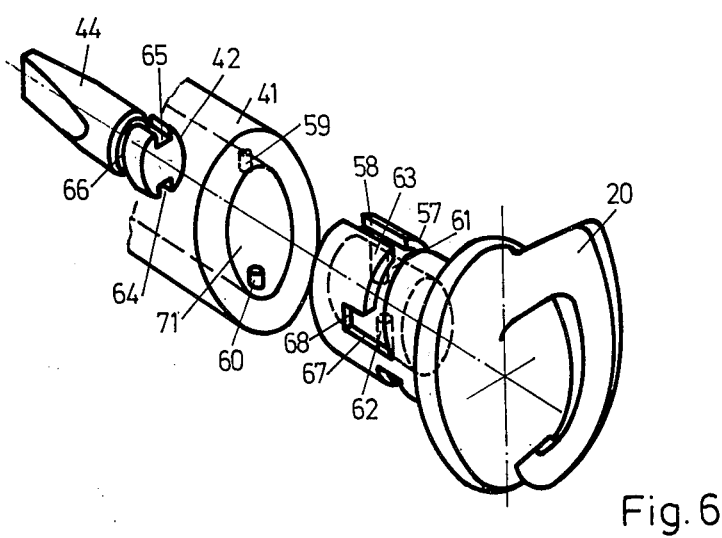
FIG. 6 is an enlarged perspective view showing details of the swinging handle.

FIG. 6 shows on an enlarged scale the operation of the applicable grip 20. It shows that the pin 44 has a connecting piece 42 which is located in the fit opening 71 of the part 41. The connecting piece 57 of the grip 20 is introduced into this opening 71. In order to produce a correct insertion at all times the piece 57 has slits 58 at its upper and lower sides which make it possible despite the pins 59 and 60 to introduce the connecting piece into the opening 71. At the end of the slits 58 there is an annular groove 61 which permits the turning of the grip 20. In the inserted condition the pins 62 and 63 engage at the grip 20 the grooves 64 and 65 at the pin 44 and extend into the annular groove 66, so that when the grip 20 is turned to the extend of 90°, namely, up to the stop 67, the pin 44 can be withdrawn from the recess 45. The groove 68 and another similarly shaped opposed groove permit the required pulling movement. They free the longitudinal movement of the grip 20 so that the pin 44 can be removed. When the holder is turned due to spring 43 (FIG. 5) into the recess 52. (The spring 43 is not shown in FIG. 6 for the sake of clarity of illustration). The recess 52 is less deep than the recess 45, so that in this position the grip is prevented from being pulled out since it is prevented from turning by the locking of the groove 68. Only after being moved back to the original position the groove 61 gets back into the range of the pins 59 and 60, so that then it is possible to turn back the grip 20 and to pull it out. This construction avoids any possibility that several holders 1 to 6 will be located at the same time in the swung out position with the result that there could be a heavy load upon the supporting floor.

FIG. 7 shows a section through the camera head 11. The collimator 70 has two grooves 80 and 81 into which extend projections 82 and 83 of the camera head. The grooves 80 and 81 are rectangular at the top and are open toward the upper side of the collimator 70. They form a bayonet lock along with the projections 82 and 83. The collimator 70 is introduced into the camera head 11 in that the projections 82 and 83 are shifted from above into the grooves 80 and 81, whereupon the collimator 70 is so turned that it is securely prevented from falling out of the camera head 11.

Each of the collimators located upon plates 1 to 6 is constructed in the manner shown in FIG. 7 and is fixed in the camera head 11 in the described manner.

Furthermore, all plates 1 to 6 and their corresponding supports are constructed as shown in FIGS. 4 and 5.

What is claimed is:

1. In combination with a gamma camera, a collimator exchangeably located in the ray inlet of the camera, a plurality of reserve collimators, and holders carrying said reserve collimators, a device for supporting said holders, said device comprising a column on the floor, and means connected with said column and supporting said holders swingably one above each other, a further column on the floor separated from the first-mentioned column and means swingably supporting the camera upon said further column, the column supporting the holders being located at such distance from the column supporting the camera that the swinging ranges of said holders and of said camera relatively to the centers of the collimators touch each other at least one location, and means providing for the exchange of a collimator between one of said holders when swung to said one location of its swinging range and the ray inlet of the camera when the camera has been swung about the further column to said one location of its swinging range.

2. A camera according to claim 1, wherein the swinging ranges of said holders and of said camera relatively to the centers of the collimators touch each other upon the line connecting their centers of rotation.

3. In combination with a gamma camera, a collimator exchangeably located in the ray inlet of the camera, a plurality of reserve collimators, and holders carrying said reserve collimators, a device for supporting said holders, said device comprising a column on the floor, and means connected with said column and supporting said holders swingably one above each other, means locking the swinging of said holders, and a single key-like grip actuating said locking means, said grip being removable from said locking means only in a basic position of said holders for use with another holder.

4. In combination with a gamma camera, a collimator removably located in the ray inlet of the camera, a plurality of reserve collimators, holders carrying said reserve collimators, a device for supporting said holders, said device comprising a column on the floor and means connected with said column and supporting said holders swingably one above each other, another column and means swingably supporting the camera upon said other column adjustably in height, the first-mentioned column supporting the holders being located at such distance from the second-mentioned column, supporting the camera that the swinging ranges of said holders and of said camera relatively to the centers of the collimators touch each other on at least one location.

* * * * *